(12) United States Patent
Cromer et al.

(10) Patent No.: US 6,687,744 B1
(45) Date of Patent: Feb. 3, 2004

(54) DATA PROCESSING SYSTEM AND METHOD FOR PERMITTING A SERVER COMPUTER SYSTEM TO FUNCTION AS A VIRTUAL KEYBOARD TO A CLIENT COMPUTER SYSTEM

(75) Inventors: Daryl Carvis Cromer, Apex, NC (US); Richard Alan Dayan, Wake Forest, NC (US); Brandon Jon Ellison, Raleigh, NC (US); Robert Duane Johnson, Raleigh, NC (US); Eric Richard Kern, Durham, NC (US); Randall Scott Springfield, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/562,534

(22) Filed: May 2, 2000

(51) Int. Cl.⁷ ............................................. G06F 15/16
(52) U.S. Cl. ...................... 709/208; 709/217; 709/218; 709/219; 709/227; 713/1
(58) Field of Search ................................ 709/201, 202, 709/203, 206, 208, 219, 217, 220, 223, 229, 237, 218, 227; 703/24; 713/1, 2

(56) References Cited

U.S. PATENT DOCUMENTS

| | | | |
|---|---|---|---|
| 5,088,033 A | * | 2/1992 | Binkley et al. ............... 703/24 |
| 5,214,785 A | | 5/1993 | Fairweather |
| 5,261,079 A | | 11/1993 | Celi, Jr. |
| 5,576,734 A | | 11/1996 | Daniele et al. |
| 5,590,315 A | | 12/1996 | Hess et al. |
| 5,640,537 A | | 6/1997 | Jessen et al. |
| 5,717,428 A | | 2/1998 | Barrus et al. |
| 5,764,956 A | | 6/1998 | Akahori et al. |
| 5,898,861 A | | 4/1999 | Emerson et al. |
| 6,170,021 B1 | * | 1/2001 | Graf .......................... 709/219 |
| 6,304,899 B1 | * | 10/2001 | Cromer et al. .............. 709/217 |
| 6,304,900 B1 | * | 10/2001 | Cromer et al. .............. 709/221 |
| 6,324,644 B1 | * | 11/2001 | Rakavy et al. ................. 713/1 |

* cited by examiner

Primary Examiner—Kenneth R. Coulter
Assistant Examiner—Paul H Kang
(74) Attorney, Agent, or Firm—Bracewell & Patterson LLP

(57) ABSTRACT

A data processing system and method are described for permitting a server computer system to function as a remote keyboard input device for a client computer system prior to the client computer system completing its boot process. The client computer system is coupled to the server computer system utilizing a network. Each keystroke entered into the server computer system is captured by the server. A scan code associated with each captured keystroke is transmitted to the client computer system utilizing the server computer system via the network. The scan code associated with each keystroke is executed utilizing the client computer system. The server computer system functions as a remote keyboard input device for the client computer system.

18 Claims, 5 Drawing Sheets

DATA PROCESSING SYSTEM AND METHOD FOR PERMITTING A SERVER COMPUTER SYSTEM TO FUNCTION AS A VIRTUAL KEYBOARD TO A CLIENT COMPUTER SYSTEM

BACKGROUND OF THE INVENTION

1. Field of the Invention

The present invention relates in general to data processing systems and, in particular, to a data processing system and method including a server and client computer systems coupled together utilizing a network. Still more particularly, the present invention relates to a data processing system and method including a server and client computer systems coupled together utilizing a network for permitting the server to function as a virtual keyboard to a client computer system.

2. Description of the Related Art

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together. Examples of such personal computer systems are IBM's PC 300 series, Aptiva series, and Intellistation series.

There currently exist a number of reasons for needing remote control of a client computer system, such as for software installation, maintenance, and error condition recovery. Very limited remote control of a client computer system is currently available through the use of the Desktop Management Interface (DMI). For example, when the client's operating system (OS) is booted, a command may be sent over the network to the client. An agent on the client is then able to retrieve the command through DMI and take action. The disadvantage of this method is that the operating system must be booted and operational in order to take advantage of this type of remote control.

Therefore a need exists for a data processing system and method for permitting a server computer system to function as a remote keyboard input device for a client computer system which has not completed its boot process, a computer system without DMI, or where an operating system is unable to run.

SUMMARY OF THE INVENTION

A data processing system and method are described for permitting a server computer system to function as a remote keyboard input device for a client computer system prior to the client computer system completing its boot process. The client computer system is coupled to the server computer system utilizing a network. Each keystroke entered into the server computer system is captured by the server. A scan code associated with each captured keystroke is transmitted to the client computer system utilizing the server computer system via the network. The scan code associated with each keystroke is executed utilizing the client computer system. The server computer system functions as a remote keyboard input device for the client computer system.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF A PREFERRED EMBODIMENT

A preferred embodiment of the present invention and its advantages are better understood by referring to FIGS. 1–5 of the drawings, like numerals being used for like and corresponding parts of the accompanying drawings.

The present invention is a method and system for permitting a server computer system to function as a remote keyboard to a client computer system which has not completed its boot process. The server captures each keystroke entered utilizing a keyboard coupled directly to the server. A scan code associated with each keystroke is then stored in a buffer in the server. The contents of the buffer are then transmitted utilizing special logic in the server's network adapter to a special Universal Datagram Port (UDP) in the client computer system's network adapter.

Upon receipt of the contents of the buffer by the client's network adapter, the client's network adapter generates a system management interrupt (SMI). An SMI interrupt handler then transfers the scan code received as the contents of the buffer to the client's keyboard controller. The client's keyboard controller then executes the scan code in the same manner that scan codes are executed which are received from a keyboard which is directly coupled to the client. The client computer system is capable of processing the received scan codes both prior to the client completing its boot process as well as after the client has booted.

Figure 1:
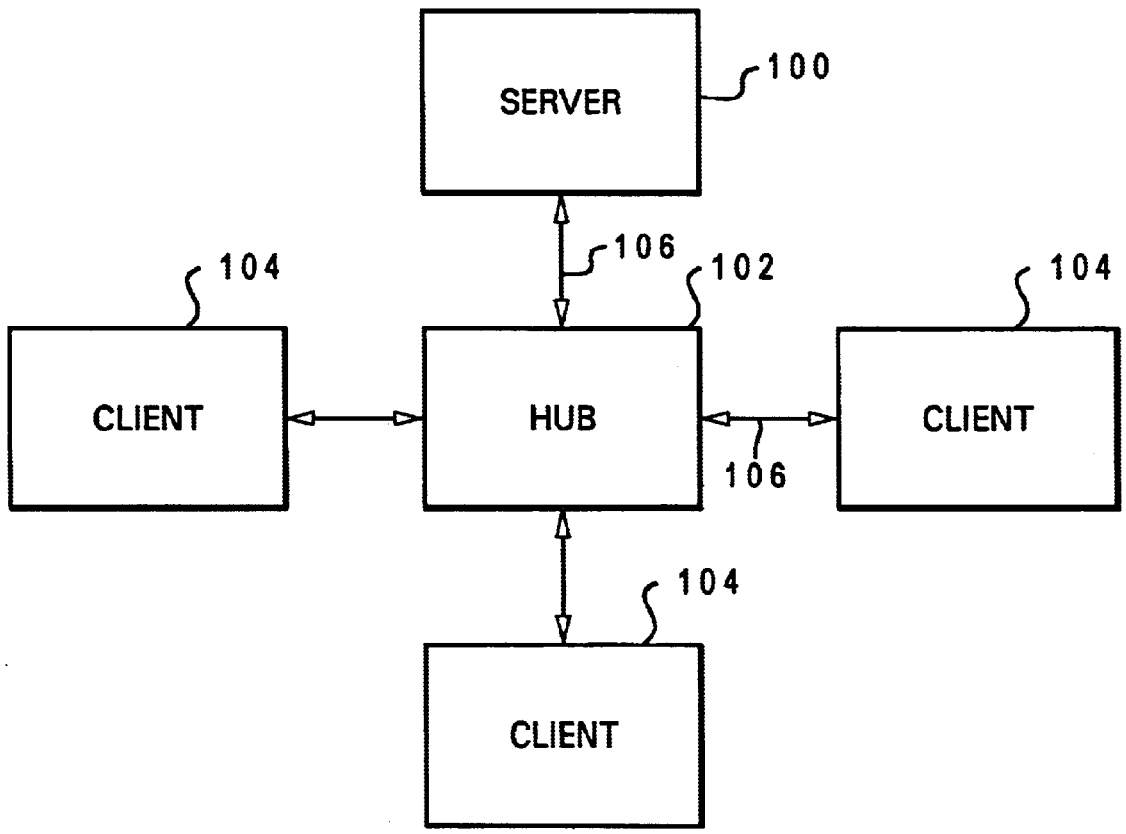
FIG. 1 illustrates a pictorial representation of a data processing system including a plurality of client computer systems coupled to a server computer system utilizing a network and a hub in accordance with the method and system of the present invention.

FIG. 1 illustrates a pictorial representation of a data processing system including a plurality of client computer systems 104 coupled to a server computer system 100 utilizing a hub 102 in accordance with the method and system of the present invention. Server computer system 100 is connected to a hub 102 utilizing a local area network (LAN) connector bus 106. Respective client systems 104 also connect to hub 102 through respective LAN busses 106. The preferred form of the network conforms to the Ethernet specification and uses such hubs. It will be appreciated, however, that other forms of networks, such as token ring, may be utilized to implement the invention.

Figure 2:
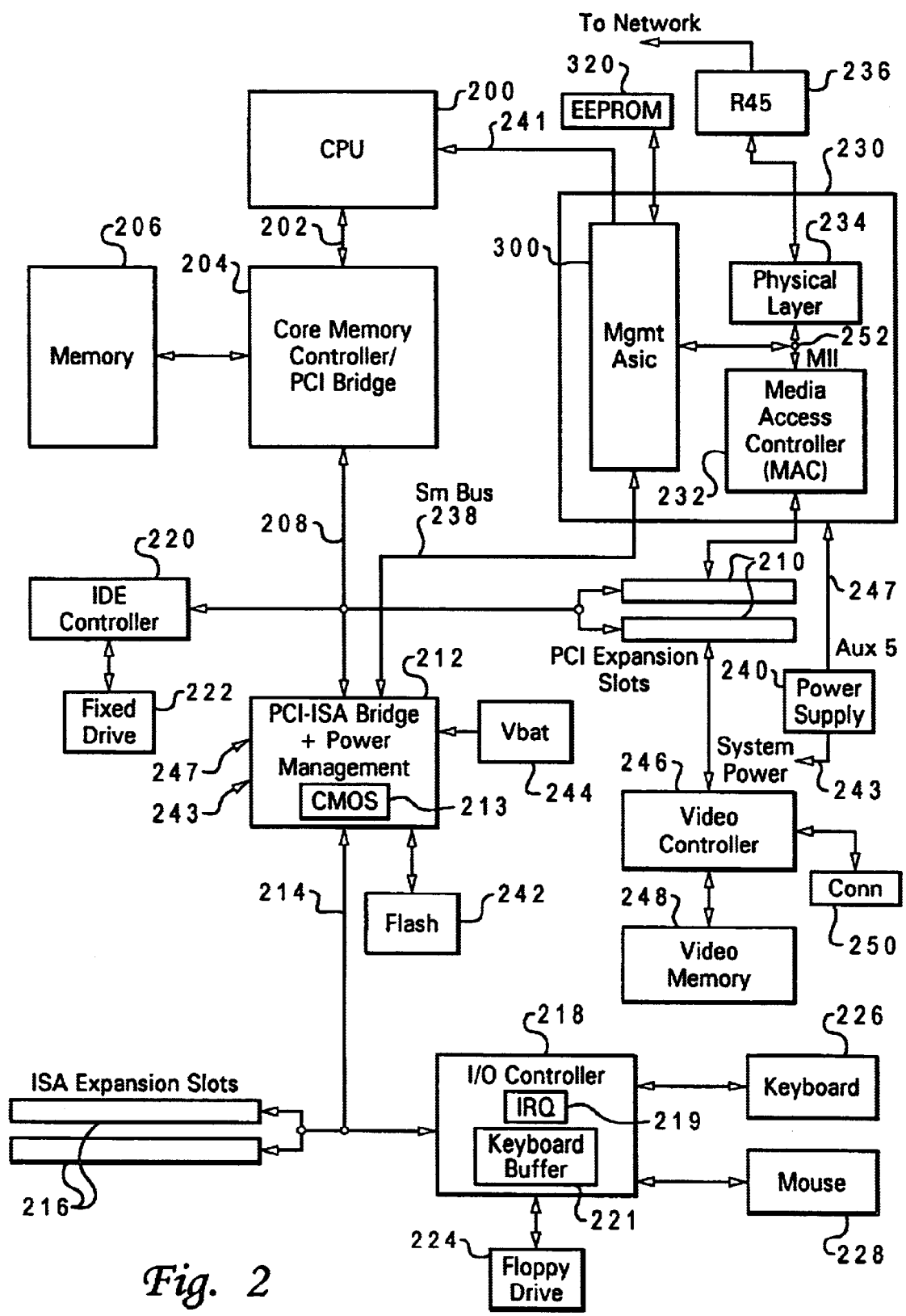
FIG. 2 depicts a more detailed pictorial representation of either a client or a server computer system of FIG. 1 in accordance with the method and system of the present invention.

FIG. 2 illustrates a pictorial representation of a network adapter 230 included within either a client or a server computer system in accordance, with the method and system of the present invention. A central processing unit (CPU) 200 is connected by address, control, and data busses 202 to a memory controller and peripheral component interconnect (PCI) bus bridge 204 which is also coupled to system memory 206.

An integrated drive electronics (IDE) device controller 220 and a PCI bus to Industry Standard Architecture (ISA) bus bridge 212 are connected to PCI bus bridge 204 utilizing PCI bus 208. IDE controller 220 provides for the attachment of IDE compatible storage devices such as fixed disk drive 222. PCI/ISA bridge 212 provides an interface between PCI bus 208 and an optional feature or expansion bus such as the ISA bus 214. PCI/ISA bridge 212 includes power management logic. A PCI standard expansion bus with connector slots 210 is coupled to PCI bridge 204. PCI connector slots 210 may receive PCI bus compatible peripheral cards. An ISA standard expansion bus with connector slots 216 is connected to PCI/ISA bridge 212. ISA connector slots 216 may receive ISA compatible adapter cards (not shown). It will be appreciated that other expansion bus types may be used to permit expansion of the system with added devices. It should also be appreciated that two expansion busses are not required to implement the present invention.

PCI-ISA bridge controller 212 includes an interface for a flash memory 242, which includes microcode which client 104 executes upon power-on. Flash memory 242 is an electrically erasable programmable read only memory (EEPROM) module and includes BIOS that is used to interface between the I/O devices and operating system. PCI-ISA bridge controller 212 also includes CMOS storage 213 that holds initialization settings which represent system configuration data. Storage 213 includes values which describe the present configuration of client 104. For example, storage 213 includes information describing the list of initial program load (IPL) devices set by a user and the sequence to be used for a particular power method, the type of display, the amount of memory, time date, etc. Furthermore, this data is stored in storage 213 whenever a special configuration program, such as configuration/setup is executed. PCI-ISA bridge controller 212 is supplied power from battery 244 to prevent loss of configuration data in storage 213.

An I/O controller 218 is coupled to PCI-ISA bridge controller 212. I/O controller 218 controls communication between PCI-ISA bridge controller 212 and devices and peripherals such as floppy drive 224, keyboard 226, and mouse 228 so that these devices may communicate with CPU 200. I/O controller 218 also includes' an IRQ register 219 for enabling/disabling of IRQ's, determining active IRQ's, and clearing IRQs.

Client system 104 includes a video controller 246 which may, for example, be plugged into one of connector slots 210. Video controller 246 is connected to video memory 248. The image in video memory 248 is read by controller 246 and displayed on a monitor (not shown) which is connected to client 104 through connector 250.

A client system 104 includes a network adapter 230 which may, for example, be plugged into one of the PCI connector slots 210 (as illustrated) or one of the ISA connector slots 216 in order to permit client 104 to communicate with a LAN via connector 236 to hub 102.

Client computer system 104 includes a special power supply 240 which supplies full normal system power 243, and has an auxiliary power main AUX 5 247 which supplies full time auxiliary power 247 to the power management logic 212 and to the network adapter 230. This enables client 104 to respond to a wakeup signal from network adapter 230. In response to a receipt of the wakeup signal, normal system power 243 from power supply 240 is turned on and then powers up client 104.

Network adapter 230 includes a physical layer 234 and a media access controller (MAC) 232 connected together utilizing a Media Independent Interface (MII) bus 252. The MII bus 252 is a specification of signals and protocols which define the interfacing of a 10/100 Mbps Ethernet Media Access Controller (MAC) 232 to the underlying physical layer 234.

MAC 232 processes digital network signals, and serves as an interface between a shared data path, i.e. the MII bus 252, and the PCI bus 208. MAC 232 performs a number of functions in the transmission and reception of data packets. For example, during the transmission of data, MAC 232 assembles the data to be transmitted into a packet with address and error detection fields. Conversely, during the reception of a packet, MAC 232 disassembles the packet and performs address checking and error detection. In addition, MAC 232 typically performs encoding/decoding of digital signals transmitted over the shared path and performs preamble generation/removal, as well as bit transmission/reception. In a preferred embodiment, MAC 232 is an Intel 82557 chip. However, those skilled in the art will recognize that the functional blocks depicted in network adapter 230 may be manufactured utilizing single piece of silicon.

Physical layer 234 conditions analog signals to go out to the network via an R45 connector 236. Physical layer 234 may be a fully integrated device supporting 10 and 100 Mb/s CSMA/CD Ethernet applications. Physical layer 234 receives parallel data from the MII local bus 252 and converts it to serial data for transmission through connector 236 and over the network. Physical layer 234 is also responsible for wave shaping and provides analog voltages to the network. In a preferred embodiment, physical layer 234 is implemented utilizing an Integrated Services chip ICS-1890.

Physical layer 234 includes auto-negotiation logic that serves three primary purposes. First, it determines the capabilities of client computer 104. Second, it advertises its own capabilities to server computer 100. Third, it establishes a connection with server computer 100 using the highest performance connection technology.

Network adapter 230 includes a special purpose processing unit 300 coupled to the MII bus 252 between physical layer 234 and MAC 232. Logic module 300 may be a "hard wired" application specific integrated circuit (ASIC) or a programmed general-purpose processor which is programmed as more fully described below. By coupling ASIC 300 to the MII bus 252, ASIC 300 may send and receive network packets using physical layer 234.

ASIC 300 is also coupled to CPU 200 utilizing system management interrupt (SMI) line 241. A system management interrupt is a low-level interrupt which is received by CPU 200. When an SMI is received by CPU 200, CPU 200 changes its execution stream in order to service the SMI. The code that CPU 200 processes in response to a receipt of an SMI could be any type of code desired by a programmer. For example, special purpose code could be written to transfer the content of one of RX buffer 318 to CMOS 213, or IRQ register 219. In this manner, ASIC 300 may transmit system management interrupts to CPU 200 for processing which could provide or update information which is not normally accessible to a network adapter.

Data from client computer system 104 is accessed by ASIC 300 over a system management bus (SM) 238. System management bus 238 is a two-wire low speed serial bus used to connect system management devices. This provides a path to allow software running on client 104 to access ASIC 300. With the trickle power supplied by signal AUX 5 247 from power supply 240, ASIC 300 is preferably powered full time.

Figure 3:
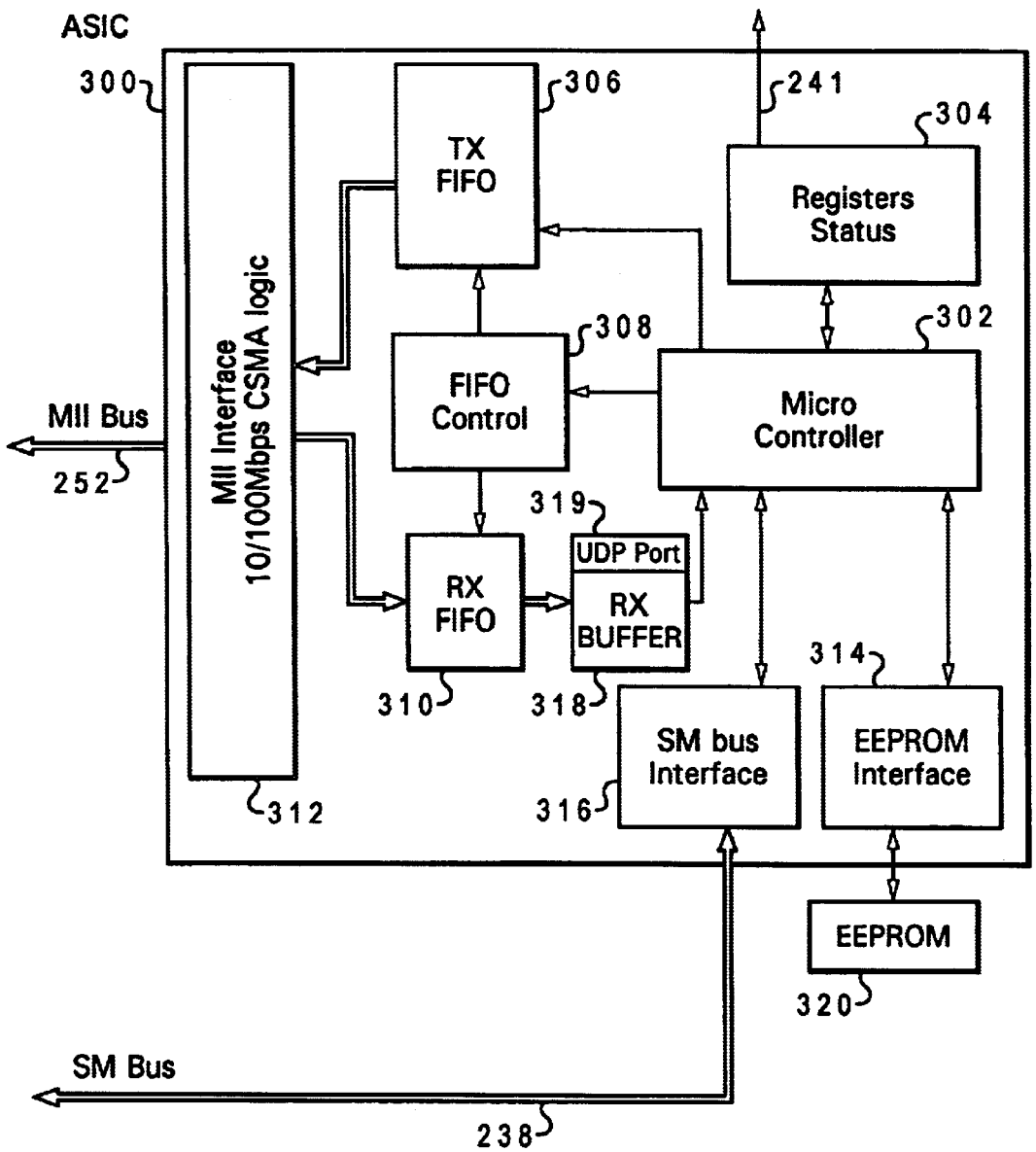
FIG. 3 illustrates a pictorial representation of a special purpose processing unit included within a network adapter included within a client computer system in accordance with the method and system of the present invention.

FIG. 3 illustrates a pictorial representation of a special purpose processing unit included within network adapter 230 included within a client computer system 104 in accordance with the method and system of the present invention. Special purpose processing unit is implemented utilizing ASIC 300 which includes a micro-controller 302 which includes several state machines to handle the following tasks: packet reception, SM bus interface, and EEPROM updates. Micro-controller 302 sends commands' to FIFO control 308 to control data flow from TX FIFO 306, RX FIFO 310, and RX Buffer 318. RX Buffer 318 includes a UDP port 319. The UDP port 319 is a special port for receiving only keystroke information packets. When data is received by UDP 319, the data is keyboard information. Micro-controller 302 also responds to SM bus requests through SM bus interface 316 from software running on client 104 to access register status 304. Register status 304 is capable of generating SMI 241. Micro-controller 302 is capable of acting as an SM bus master. Signals are received from the MII bus 252 by interface unit 312 and passed to RX FIFO 310. ASIC 300 includes an EEPROM interface 314 for coupling ASIC 300 to a storage device such as EEPROM 320.

Figure 4:
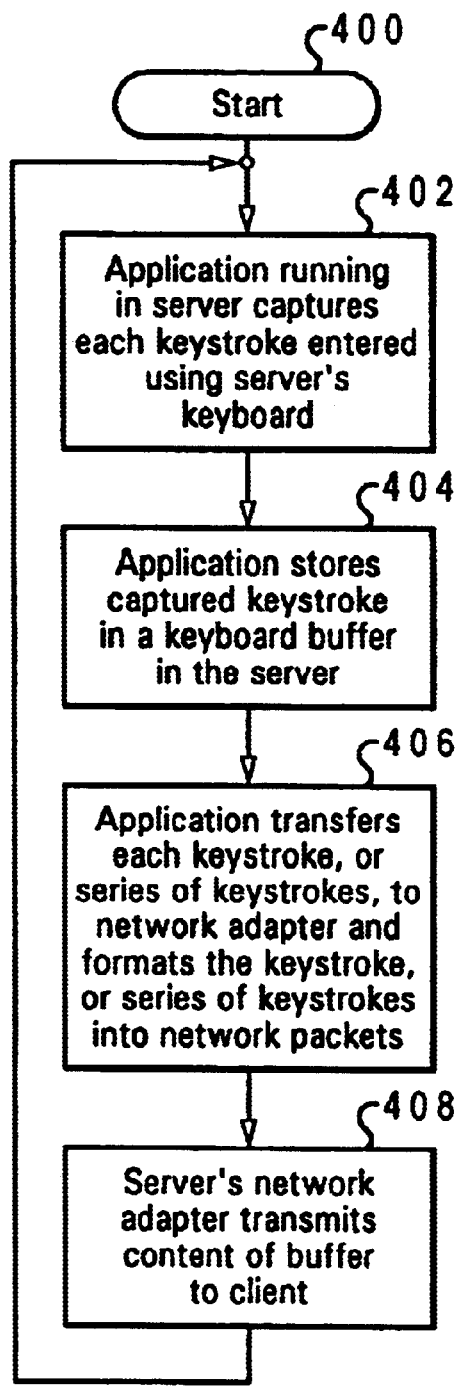
FIG. 4 depicts a high level flow chart which illustrates a server computer system capturing each keystroke entered into the server and transmitting associated scan codes to a client computer system in accordance with the method and system of the present invention.

FIG. 4 depicts a high level flow chart which illustrates a server computer system capturing each keystroke entered into the server and transmitting associated scan codes to a client computer system in accordance with the method and system of the present invention. The process starts as depicted at block 400 and thereafter passes to block 402 which illustrates application code running on the server computer system capturing a keystroke generated from a keyboard coupled directly to the server. Next, block 404 depicts the application code storing a scan code associated with the captured keystroke in a keyboard buffer in the server. Each depression of a key and each release of a key is associated with one of a plurality of scan codes. Therefore, each key on the keyboard is associated with two different scan codes, one indicating a depression of that key and one indicating a release of that key. A scan code associated with the captured keystroke, either a key depression or release, is stored in a buffer in the server computer system. Block 406, then, illustrates the application transferring each keystroke, or a series of keystrokes, to the a status register, such as a status register 304, in the server's network adapter and formats the keystroke, or series of keystrokes, into network packets. Thereafter, block 408 illustrates the server's network adapter transmitting the contents of the buffer to the client computer system. The process then passes back to block 402.

Figure 5:
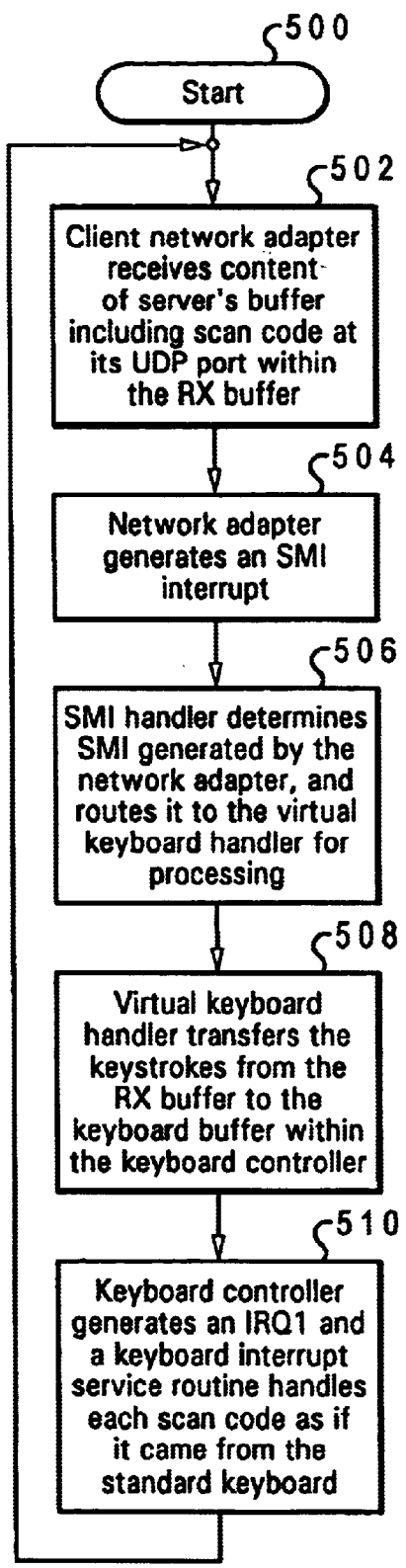
FIG. 5 illustrates a high level flow chart which depicts a client computer system receiving scan codes from a server computer system and a keyboard controller included within the client executing the scan codes in accordance with the method and system of the present invention.

FIG. 5 illustrates a high level flow chart which depicts a client computer system receiving scan codes from a server computer system and a keyboard controller included within the client executing the scan codes in accordance with the method and system of the present invention. The process of FIG. 5 may be executed either prior to the client computer system completing its boot process, or after the client has booted. The process starts as depicted at block 500 and thereafter passes to block 502 which illustrates the network adapter of the client receiving the contents of the buffer from the server computer system. This data is received by the UDP port 319 included within the client. Thereafter, block 504 depicts the network adapter generating a system management interrupt (SMI). The generation of the SMI will ensure that the client's BIOS code will not attempt to handle the scan code received from the server. Instead, the SMI handler will process the scan code.

The process then passes to block 506 which illustrates the SMI handler determining that the SMI was generated by the network adapter, and routing the SMI to a virtual keyboard handler for processing. Next, block 508 depicts the virtual keyboard handler transferring the keystrokes from the RX buffer 310 to the keyboard buffer 221 included within keyboard controller 218. The virtual keyboard handler may wait until the RX buffer is full before transferring the keystrokes, or it may transfer the keystrokes at any time prior to the buffer being full. Next, block 510 illustrates the keyboard controller generating an interrupt IRQ1. A keyboard interrupt service routine handles each scan code as if it came from the standard keyboard coupled to the client. The process then passes back to block 502.

While a preferred embodiment has been particularly shown and described, it will be understood by those skilled in the art that various changes in form and detail may be made therein without departing from the spirit and scope of the present invention.

What is claimed is:

1. A method in a data processing system for permitting a remote server computer system to function as a remote keyboard input device for a client computer system, said method comprising the steps of:

coupling said client computer system to said server computer system utilizing a network;

capturing each keystroke entered into said server computer system;

transmitting a scan code associated with each captured keystroke to said client computer system from said server computer system via said network;

receiving said scan code at an RX buffer of said client computer system that includes a Universal Datagram Port (UDP) designed for receiving scan codes of captured keystrokes; and executing said scan code associated with each keystroke within said client computer system, wherein said scan code is executed prior to said client computer system completing a boot process, wherein also said server computer system functions as a remote keyboard input device for said client computer system.

2. The method according to claim 1, further comprising the steps of:

forwarding said scan code from said RX buffer to a keyboard controller of said client computer system; and executing said scan code for each keystroke utilizing said keyboard controller.

3. The method according to claim 2, further comprising the steps of:

storing a scan code in said server computer system in response to a keystroke being received by a keyboard coupled to said server computer system, said scan code being associated with said keystroke; and transmitting said scan code in response to said storage.

4. The method according to claim 3, further comprising the steps of:

receiving said scan code utilizing a network adapter included within said client computer system, said scan code being received by said UDP port, which is designed to receive only keystroke information packets; and generating an interrupt in response to said receipt of said scan code, said interrupt being processed by an interrupt handler which transmits said scan code to said keyboard controller.

5. The method of claim 1, wherein said executing step further comprises:

enabling initial processing of the scan codes received at the UDP via an SMI handler within the client computer system, wherein BIOS code is prevented from handling scan codes received from said server.

6. The method of claim 1, wherein said executing step further includes:

storing said received keystroke information within said RX buffer; and transferring said keystroke information from said RX buffer to said keyboard controller when said RX buffer is full.

7. The method of claim 1, wherein said executing step further includes:

storing said received keystroke information within said RX buffer; and transferring said keystroke information from said RX buffer to said keyboard controller when said keystroke information is received within said RX buffer.

8. A data processing system for permitting a remote server computer system to function as a remote keyboard input device for a client computer system, comprising:

said client computer system being coupled to said server computer system utilizing a network;

means for capturing each keystroke entered into said server computer system;

means for transmitting a scan code associated with each captured keystroke to said client computer system utilizing said server computer system via said network;

a Universal Datagram Port (UDP) designed for receiving scan codes of captured keystrokes, wherein said UDP is a component of an RX buffer and receives only keystroke information packets, and wherein said scan code is received at said RX buffer via said UDP; and means for executing said scan code associated with each keystroke utilizing said client computer system, wherein said scan code may be executed prior to said client computer system completing a boot process, wherein also said server computer system functions as a remote keyboard input device for said client computer system.

9. The system according to claim 5, further comprising:

means for forwarding said scan code from said RX buffer to a keyboard controller of said client computer system; and means for executing said scan code for each keystroke utilizing said keyboard controller.

10. The system according to claim 9, further comprising:

a buffer for storing a scan code in said server computer system in response to a keystroke being received by a keyboard coupled to said server computer system, said scan code being associated with said keystroke; and means for transmitting said scan code in response to said storage.

11. The system according to claim 10, further comprising:

means for receiving said scan code utilizing a network adapter included within said client computer system; and means for generating an interrupt in response to said receipt of said scan code, said interrupt being processed by an interrupt handler which transmits said scan code to said keyboard controller.

12. The system of claim 8, wherein said means for executing further comprises:

means for enabling initial processing of the scan codes received at the UDP via an SMI handler within the client computer system, wherein BIOS code is prevented from handling scan codes received from said server.

13. The system of claim 8, wherein said means for executing further includes:

means for storing said received keystroke information within said RX buffer; and means for transferring said keystroke information from said RX buffer to said keyboard controller when said RX buffer is full.

14. The system of claim 8, wherein said means for executing further includes:

means for storing said received keystroke information within said RX buffer; and means for transferring said keystroke information from said RX buffer to said keyboard controller when said keystroke information is received within said RX buffer.

15. A system for permitting a remote server computer system to function as a remote keyboard input device for a client computer system, comprising:

said client computer system being coupled to said server computer system utilizing a network;

means for capturing each keystroke entered into said server computer system;

means for transmitting a scan code associated with each captured keystroke to said client computer system utilizing said server computer system via said network;

a Universal Datagram Port (UDP) designed for receiving scan codes of captured keystrokes, wherein said UDP is a component of an RX buffer and receives only keystroke information packets, and wherein said scan code is received at said RX buffer via said UDP;

means for executing said scan code associated with each keystroke utilizing said client computer system prior to said client computer system completing a boot process, wherein said server computer system functions as a remote keyboard input device for said client computer system;

means for executing said scan code for each keystroke utilizing a keyboard controller included within said client computer system;

a buffer for storing a scan code in said server computer system in response to a keystroke being received by a keyboard coupled to said server computer system, said scan code being associated with said keystroke;

means for transmitting said scan code in response to said storage;

means for receiving said scan code utilizing a network adapter included within said client computer system; and means for generating an interrupt in response to said receipt of said scan code, said interrupt being processed by an interrupt handler which transmits said scan code to said keyboard controller.

16. The data processing system of claim 15, wherein said means for executing further comprises:

means for enabling initial processing of the scan codes received at the UDP via an SMI handler within the client computer system, wherein BIOS code is prevented from handling scan codes received from said server.

17. The data processing system of claim 15, wherein said means for executing further includes:

means for storing said received keystroke information within said RX buffer; and means for transferring said keystroke information from said RX buffer to said keyboard controller when said RX buffer is full.

18. The data processing system of claim 15, wherein said means for executing further includes:

means for storing said received keystroke information within said RX buffer; and means for transferring said keystroke information from said RX buffer to said keyboard controller when said keystroke information is received within said RX buffer.

* * * * *